United States Patent [19]
Doster et al.

[11] Patent Number: 5,718,325
[45] Date of Patent: Feb. 17, 1998

[54] ADJUSTABLE CONVEYOR SYSTEM FOR MAN-LOADED CARGOS

[76] Inventors: John Doster, 108 Old Natchez Trace Trail, Saltillo, Miss. 38866; Jimmy Barnett; Joe Barnett, both of Rte. 1, Box 515, Nettleton, Miss. 38858

[21] Appl. No.: 635,200

[22] Filed: Apr. 19, 1996

Related U.S. Application Data

[63] Continuation-in-part of Ser. No. 429,754, Apr. 27, 1995, abandoned, which is a continuation-in-part of Ser. No. 402,921, Mar. 13, 1995, abandoned, which is a continuation of Ser. No. 270,018, Jul. 1, 1994, abandoned, which is a continuation of Ser. No. 975,915, Nov. 13, 1992, Pat. No. 5,325,953.

[51] Int. Cl.[6] .................................................. B65G 41/00
[52] U.S. Cl. .......................... 198/592; 198/594; 198/782; 198/304; 193/35 TE; 414/398; 414/508
[58] Field of Search ...................... 198/782, 592, 198/594, 304; 193/35 TE; 414/398, 392, 391, 508

[56] References Cited

U.S. PATENT DOCUMENTS

| | | | |
|---|---|---|---|
| 1,249,239 | 12/1917 | Suffolk. | |
| 2,627,960 | 2/1953 | Eberle | 193/35 |
| 2,870,922 | 1/1959 | Thomson | 198/592 |
| 2,880,849 | 4/1959 | Craggs et al. | 198/139 |
| 3,134,480 | 5/1964 | Loosli | 198/117 |
| 3,356,236 | 12/1967 | Shaw et al. | 414/398 |
| 3,476,089 | 11/1969 | Jerome | 119/82 |
| 3,651,963 | 3/1972 | McWilliams | 214/6 G |
| 3,687,276 | 8/1972 | Pelletier | 198/233 |
| 4,266,650 | 5/1981 | Patel et al. | 193/35 TE |
| 4,279,555 | 7/1981 | Rydell | 414/83 |
| 4,312,619 | 1/1982 | Anderson et al. | 414/347 |
| 5,013,204 | 5/1991 | Leon | 414/347 |
| 5,118,241 | 6/1992 | Cochran et al. | 198/782 |
| 5,224,584 | 7/1993 | Best et al. | 198/782 |
| 5,325,953 | 7/1994 | Doster et al. | 198/304 |
| 5,525,025 | 6/1996 | Ootmar Ten Cate et al. | 198/782 |

FOREIGN PATENT DOCUMENTS

| | | | |
|---|---|---|---|
| 957634 | 11/1974 | Canada | 198/594 |
| 83903 | 4/1987 | Japan | 198/594 |

*Primary Examiner*—Karen B. Merritt
*Assistant Examiner*—Douglas Hess
*Attorney, Agent, or Firm*—Baker, Donelson, Bearman & Caldwell

[57] ABSTRACT

A fully adjustable conveyor system for transporting loose items of cargo which are to be manually loaded or unloaded by a worker. In one embodiment, the conveyor system includes a powered device, such as a driveable, maneuverable tug which is provided with a vertically adjustable operator platform, expandable and vertically adjustable first and second powered conveyor units. In a second embodiment, the conveyor system includes an electrically powered mobile base frame which is provided with an adjustable operator platform, a vertically adjustable first conveyor, and a flexible expandable second conveyor. The conveyor system of the present invention includes a control system for positioning the conveyor system at the optimum height and location for efficiently loading and unloading cargo and significantly reducing the risk of strain and injury to the workers handling the cargo.

19 Claims, 6 Drawing Sheets

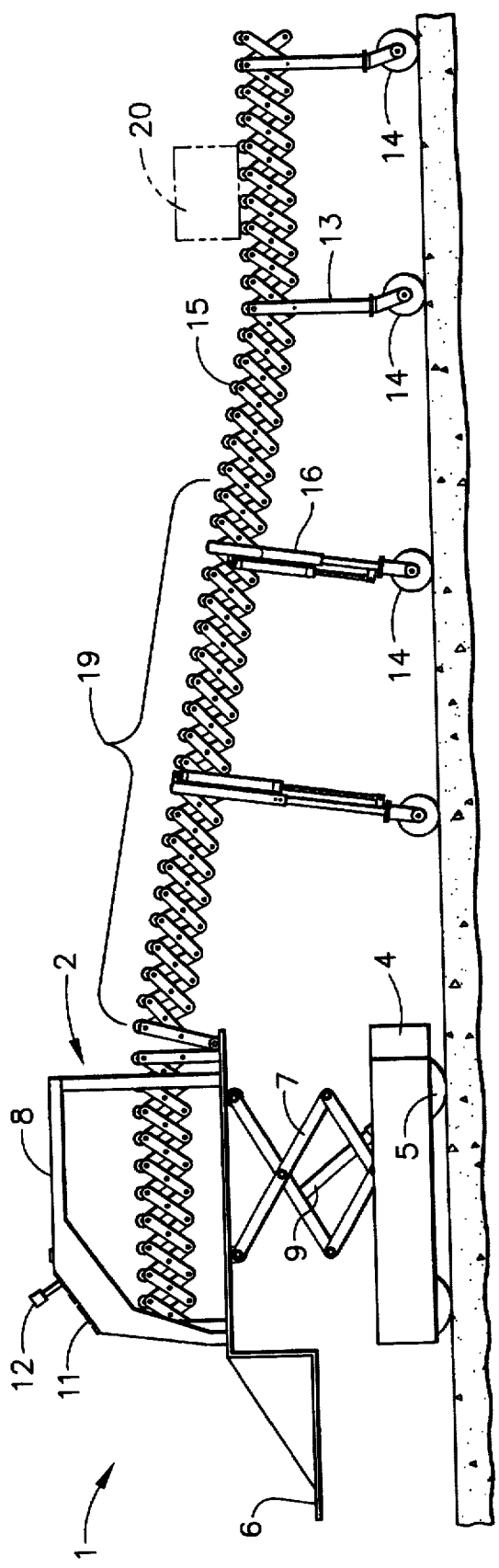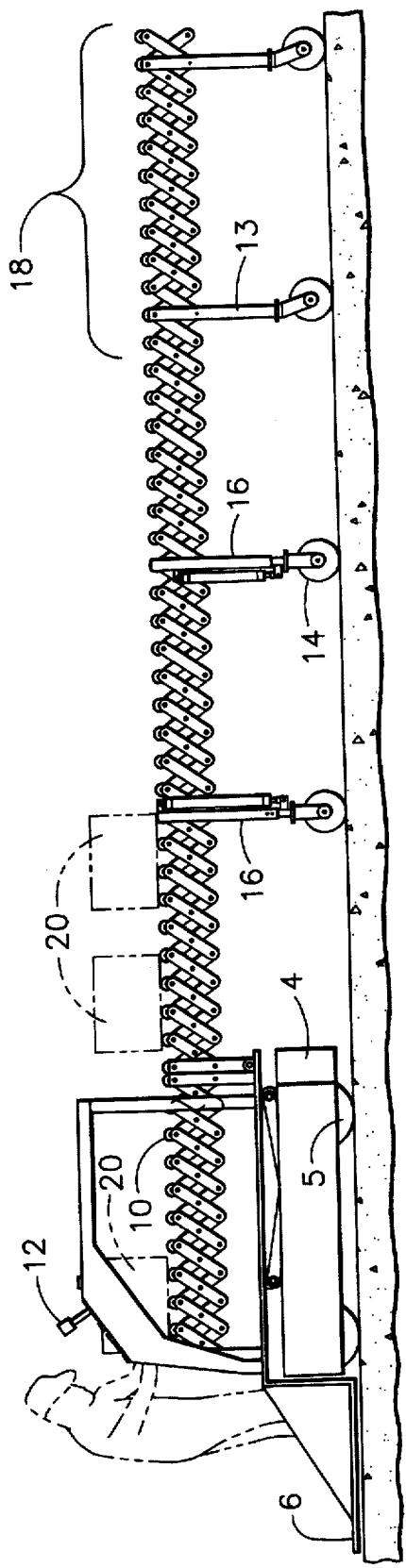

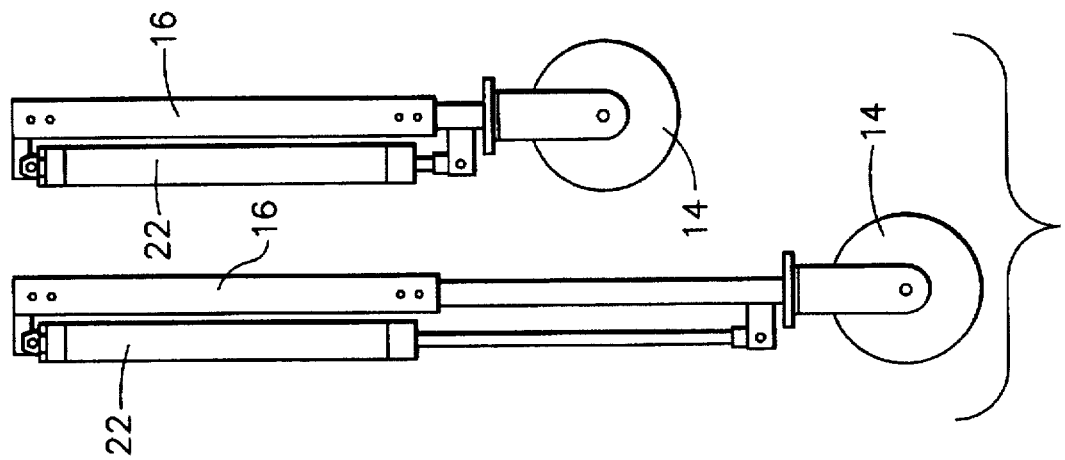
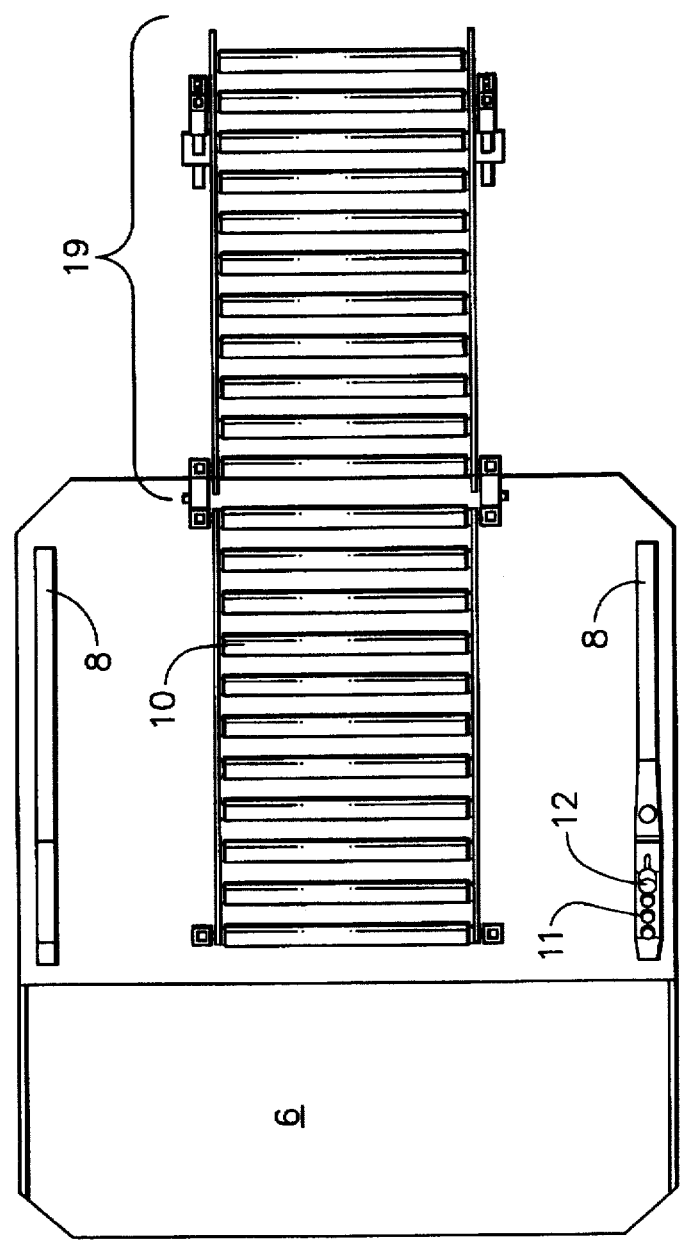
FIG. 4
FIG. 3

5,718,325

ADJUSTABLE CONVEYOR SYSTEM FOR MAN-LOADED CARGOS

CROSS-REFERENCE

The present application is a continuation-in-part of application Ser. No. 08/429,754, filed Apr. 27, 1995, entitled "Adjustable Conveyor System For Man-Loaded Cargos," now abandoned, which is a continuation-in-part of application Ser. No. 08/402,921, filed Mar. 13, 1995, entitled "Adaptable Conveyor For Man-Loaded Cargos, now abandoned, which is a continuation of application Ser. No. 08/270,018, filed Jul. 1, 1994, entitled "Adaptable Conveyor For Man-Loaded Cargos," now abandoned, which is a continuation of application Ser. No. 07/975,915, filed Nov. 13, 1992, entitled "Adaptable Conveyor For Man-Loaded Cargos," now U.S. Pat. No. 5,325,953, issued on Jul. 5, 1994.

BACKGROUND OF THE INVENTION

The present invention relates to the field of cargo loading machinery, especially to apparatus for more safely and efficiently loading and unloading loose items in a container or truck, where manual placement of the cargo by cargo handlers is required.

U.S. Pat. No. 3,651,963, to McWilliams discloses a conveyor for loading mail bags from a loading dock into a trailer. This conveyor system has two fixed power driven conveyors, each individually, manually controlled for on/off. The conveyors are interconnected about a hinging point so that the conveyor system (front and rear conveyors) may be moved in and out of the truck. The end conveyor is supported at a mid point by a hoisting mechanism and pivots around its rearward point so that its discharge end may be raised or lowered in the vehicle. Lateral positioning with the vehicle requires moving the entire conveyor.

U.S. Pat. No. 1,249,239 to Suffolk discloses a conveyor, for use in a coal mine for transporting bulk coal. This conveyor discloses a mechanism which shows a typical construction for a telescoping, gravity fed conveyor.

U.S. Pat. No. 2,627,960 to Eberle discloses a telescoping conveyor of the gravity fed roller type. This is described as being a truck bed loading conveyor. This patent also discloses a mechanism for temporary holding of delivered articles; operator intervention is required to deflect overflow bundles to a holding table (78). The claims of this patent are generally drawn to an extensible telescoping conveyor, with means at a work delivery end for raising and lowering the work delivery end.

U.S. Pat. No. 2,880,849 to Craggs, et el discloses a telescoping powered conveyor with means for raising and lowering the end. The claims are directed to a system of suspending the intermediate support rollers for the conveyor belt from a cable or strands, claimed to provide a self-aligning capability for centering the conveyor belt under varying loads.

U.S. Pat. No. 3,687,276 to Pelletier discloses in combination a concrete conveyor containing a multiplicity of angled or telescoping powered conveyor belts.

U.S. Pat. No. 3,134,480 to Loosli discloses a conveyor. The claim is drawn to a combination of a chain drive conveyor which can easily be driven in a small and a belt conveyor for protecting delicate produce from the chain. The patent discloses a mobile, two section conveyor having a fixed, powered section and a second, tilting powered section for delivery of produce to varying heights.

U.S. Pat. No. 3,476,089 to Jerome discloses another form of variable inclined conveyor having a single conveyor section in which there is both an upper and lower belt so as to restrain the transported object between the tow belts.

U.S. Pat. No. 4,279,555 to Rydell. The structure of this conveyor includes a feed conveyor (22), and angularly variable elevator conveyor (24) and a final horizontal feed conveyor (26). It is a part of the invention that the horizontal feed conveyor 26 is maintained level even though the elevator 24 may be raised or lowered.

U.S. Pat. No. 5,325,953, to Doster et al., discloses a combination, multiple section conveyor for man-loaded cargos which feeds cargo items onto a telescoping gravity fed conveyor. The telescoping conveyor may be extended or retracted, and ends at an interconnected, second powered elevating conveyor, which raises the cargo items to an elevated short telescoping delivery conveyor, whose height and extension is manually controlled by loading personnel to maintain the height of delivered cargo items at waist level for ease of handling. The rate of delivery of cargo items by the second powered conveyor is controlled by the arrival of objects at the second powered conveyor, as detected by a cargo sensor, such as a photo electric eye.

However, a need continues to exist for a cargo loading and unloading system which is driveable, maneuverable, and adjustable in all directions in order to safely and efficiently load and unload a variety of goods into and out of different sized shipping containers from any location.

SUMMARY OF THE INVENTION

The present invention satisfies these needs by providing an apparatus and system for loading and off loading cargo which includes an adjustable positioning means for positioning a worker and the cargo to be loaded at an optimum level for safe and efficient loading and unloading. The adjustable positioning means is connected to an adjustable conveyor means for transporting the cargo to and from a loading area. The adjustable positioning means may be a driveable, easily maneuverable powered tug unit which can be steered in any direction within a storage container, such as a trailer, truck bed, or standard shipping or ocean container. The tug unit or other positioning means of the present invention is of a size which is easily maneuvered in all directions inside any standard shipping or ocean container.

The tug unit is provided with an operator platform which may be raised and lowered to any height within a storage container. The operator platform may be raised and lowered manually or automatically by any means suitable for adjusting the height of the platform. In one embodiment, the operator platform may be supported by hydraulically controlled scissor lifts which automatically raise and lower the platform when a worker operates a control panel provided on the conveyor system. In a second embodiment, the operator platform may be supported by an electrically controlled ball screw assembly. Preferably, the operator platform can be lowered to ground level so that a worker can lift or place cargo at floor level without stepping down. The operator platform may be provided with variable extensions to allow the width of the platform to be adjusted as needed so that a worker can safely and efficiently load or unload cargo from the bottom to the top and from side to side in any storage container without strain. Guard rails may be provided on the sides of the platform to protect the hands and feet of the worker. Control means for automatically adjusting the position of various components of the conveyor system may be conveniently located within or on the guard rails to provide easy access for the worker when adjusting the conveyor system during the loading operation.

A first conveyor means is mounted on the operator platform for receiving the cargo being loaded or unloaded. Although any suitable conveyor means may be employed, the first conveyor means may be a section of a flexible, expandable conveyor means which is provided with powered rollers for transporting cargo in a forward or a reverse direction. The first conveyor means may be vertically adjustable for raising or lowering to the optimum height for safe, efficient loading and unloading by any sized worker. The first conveyor means may also be horizontally and laterally adjustable so that the cargo is delivered directly from the first conveyor means to a final stationary location with only minimal guidance being provided by the worker. In a second embodiment, the first conveyor means is a belt-type conveyor which is mounted on the operator platform so that the conveyor means is automatically raised or lowered when the operator platform is raised or lowered to deliver the cargo directly to the worker, regardless of the position of the operator platform. In a particularly preferred second embodiment, the conveyor means comprises two separate belt-type conveyors which cooperate to transport the cargo from a second expandable conveyor means to a worker on the operator platform.

The powered tug unit or other adjustable positioning means of the present invention is connectable to a second conveyor means for transporting the cargo from one location, such as a loading dock, to another location, such as storage container. Preferably, the second conveyor means may be raised or lowered with the operator platform so that the second conveyor means delivers the cargo directly onto the first conveyor means on the platform, regardless of the position of the platform. In a preferred embodiment, the second conveyor means is a light-weight, flexible, expandable conveyor. The flexible conveyor is provided with powered rollers which can be operated in both the forward and reverse directions for loading and off-loading cargo. However, the present tug unit or other positioning means may be operated in connection with any type conveyor means suitable for transporting man-loaded cargo into and out of a storage container, such as a belt-type conveyor. The second conveyor means may be supported by vertical legs having freely rotating wheels for ease in expanding and retracting the second conveyor means as needed during the loading operation. In a particularly preferred embodiment, the second conveyor means may be provided with a series of vertically adjustable struts for supporting the end of the second conveyor means connected to the tug when the second conveyer means is raised and lowered to a height which corresponds to the position of the operator platform. In one embodiment, the adjustable struts are provided with pneumatic pumps for automatically raising and lowering the end of the second conveyor means which is connected to the platform. The expandable second conveyor means may be extended or retracted and raised or lowered as the tug unit is maneuvered according to the worker's loading needs. The position of both the first and second conveyor means may be adjusted manually or by automatic means for adjusting the position provided in the conveyor system of the present invention. Thus, cargo handlers who are filling a space, such as a truck trailer, or otherwise are working against a variable work position, may at all times have cargo items presented to them by the present adjustable conveyor system at an optimum height and position for man handling, which significantly minimizes the risk of injury from excessive twisting and strain when manually loading and unloading cargo items for placement.

BRIEF DESCRIPTION OF THE DRAWINGS

These and other features, aspects, and advantages of the present invention will become better understood when referring to the following description, appended claims, and accompanying drawings where:

FIG. 1 is a side view embodying features of the conveyor system of the present invention in a raised position;

FIG. 2 is a side view embodying features of the conveyor system of the present invention in a lowered position;

FIG. 3 is a top view embodying features of the tug unit provided in the conveyor system of the present invention;

FIG. 4 is a side view embodying features of the adjustable struts provided on the conveyor system of the present invention;

DETAILED DESCRIPTION

Figure 5:
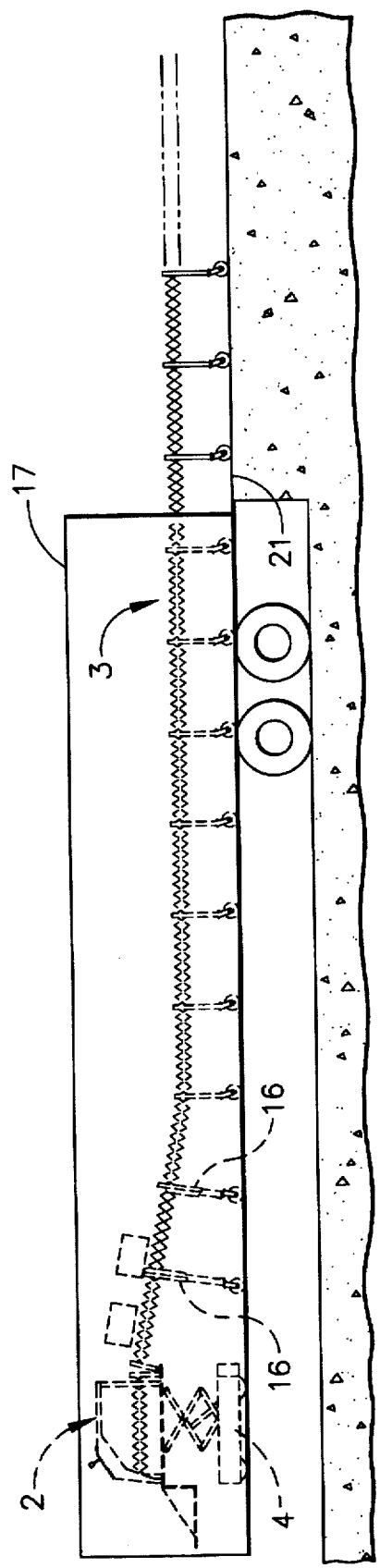
FIG. 5 is a side view illustrating the conveyor system of the present invention within a container to be loaded, with the tug unit in a raised position and the conveyor unit in an extended position.

The conveyor system 1 of the present invention is provided with a powered, adjustable positioning means for variably positioning the conveyor system and a worker in relation to the cargo to be loaded and a conveyor means for transporting the cargo to and from a loading area. As shown in FIGS. 1 and 2, the powered positioning means may be a mobile maneuverable tug unit, designated generally as 2. The conveyor means utilized in the present system 1 may be cooperating first and second conveyor units designated as 10 and 3, respectively. The tug unit 2 illustrated in FIGS. 1 and 2 includes a base frame 4 which is mounted on the wheels 5 which allow the tug 2 to be maneuvered in any direction. An operator platform 6 is connected to the base frame 4 by a suitable support structure 7. The support structure 7 is provided with means for raising and lowering the platform 6 to any desired height. In a preferred embodiment, a scissors lift support structure 7 is powered by an hydraulic pump 9 to raise and lower the operator platform 6. As shown in FIGS. 1-3, the operator platform 6 may be further provided with guard rails 8 on either side of the operator platform 6 to protect the hands and feet of the operator. The control means 11 may be mounted within the guard rails 8 and may include hand controls for steering the tug unit 2, such as the joystick 12, and controls for raising and lowering the platform 6, for controlling the direction of movement cargo on the conveyor unit 3, and for controlling any other optional functions which may be provided on the conveyor system 1 of the present invention.

The shorter first conveyor means 10 is mounted on the upper surface of platform 6. The first conveyor means 10 may be either permanently or removably mounted on the platform 6. Preferably, the first conveyor means 10 is provided with means for vertically adjusting the height of the conveyor means 10 to a position in relation to the height of any worker which is optimal for reducing the strain and risk of injury associated with handling heavy cargo. In a particularly preferred embodiment shown in FIG. 4, the first conveyor means 10 is a flexible conveyor section having powered rollers 15 which move cargo in either a forward or a reverse direction. The first conveyor means 10 may also be provided with means for adjustment in a horizontal or lateral position so that cargo may be delivered directly from the first conveyor means to a final stationary location with only minimal guidance provided by the worker.

The tug unit 2 of the present invention may be any type of mobile, powered unit which is driveable and maneuverable in all directions. The base frame 4 may house a motor (not shown) for propelling the tug unit 2, the hydraulic pump 9 for raising and lowering platform 6, and any other mechanisms needed for the operation of the conveyor system 1. The operator platform 6 can be raised and lowered to any height and the tug unit 2 may be maneuvered from side to side as needed to load and unload cargo at the optimum position for the safety and efficiency of the worker. The operator platform 6 may be provided with variable extensions on the sides to allow the width of platform 6 to be adjusted as needed for optimum positioning of the cargo loader within a storage container.

Figure 7:
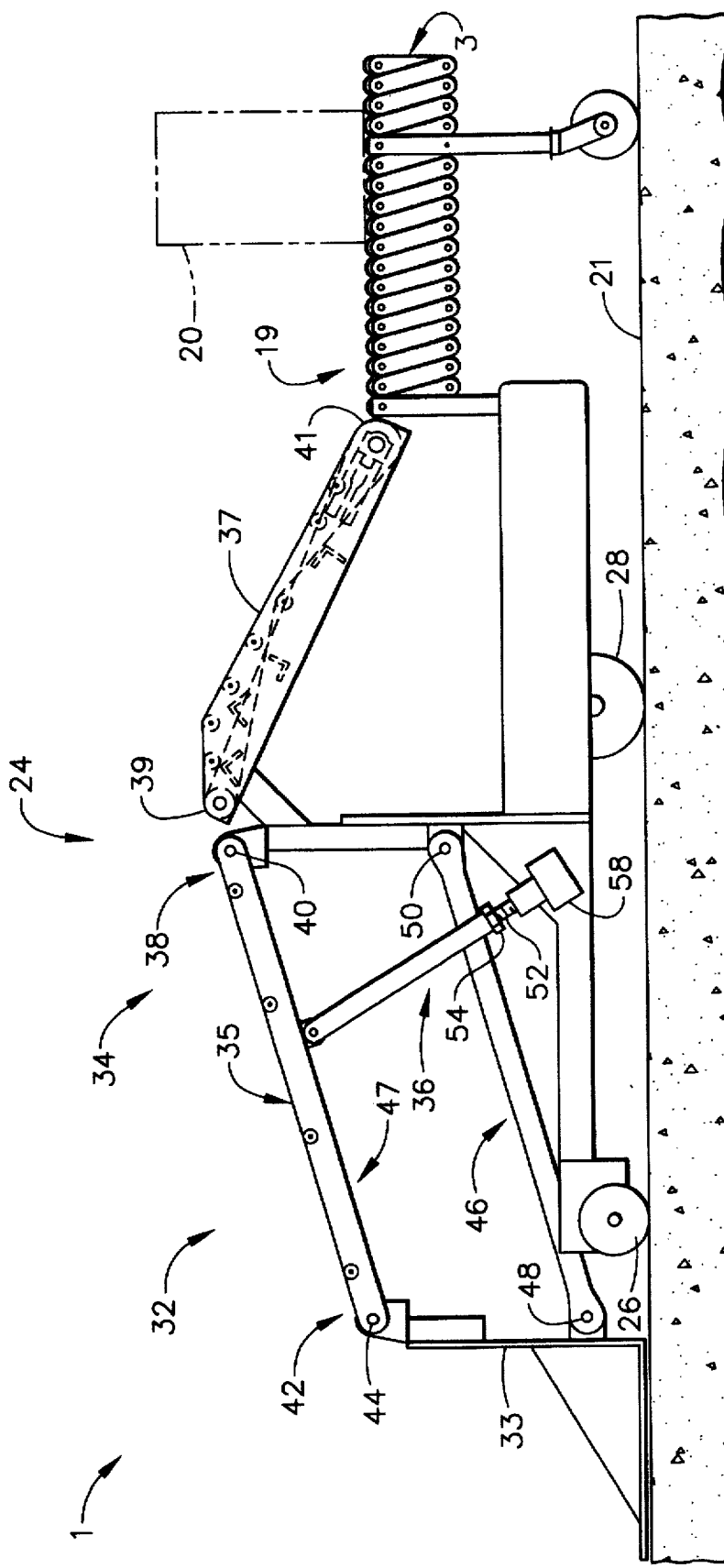
FIG. 7 is a side view of an alternate embodiment of the present invention with the operator platform shown in a lowered position.
Figure 9:
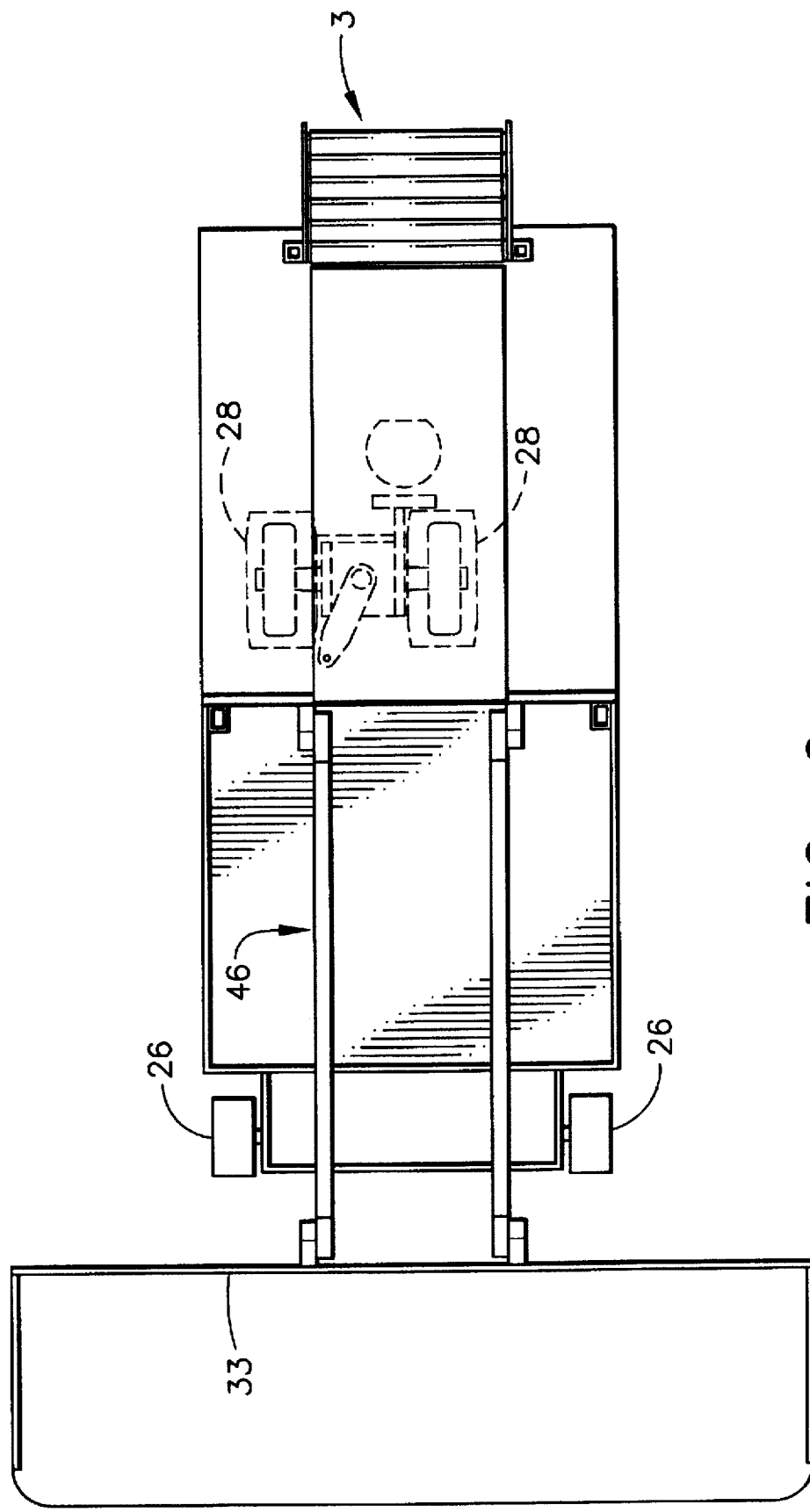
FIG. 9 is a top plan view of an alternate embodiment of the present invention showing the wheels of the mobile base frame in a tricycle arrangement.

In a second embodiment, shown in FIG. 7., the powered positioning means may be a mobile maneuverable base frame 24 which is mounted on a pair of front wheels 26 and a pair of rear wheels 28 having a tricycle arrangement. Referring to FIG. 9, the front wheels 26 are spaced apart and mounted at opposite corners of the front of the mobile base frame 24. The rear wheels 28 are juxtaposed in a side-by-side relation and mounted at a point approximately in the center of the rear half of the mobile base frame 24 for steering and easily maneuvering the mobile base frame 24 in any direction. An operator platform 32, which is secured to the mobile base frame 24, is comprised of a worker area 33, a lower bracket 46, an upper bracket 47, and a suitable support mechanism 36. The upper bracket 47 and the lower bracket 46 are substantially parallel and are secured at one end to the mobile base frame 24 by pivot connections 40 and 50, respectively. At an opposite end, the upper bracket 47 and the lower bracket 46 are secured to the worker area 33 by pivot connections 44 and 48, respectively. The support mechanism 36 is attached to one of the brackets of the operator platform 32 and is provided with a means for raising and lowering the operator platform 32 to any desired height. In a preferred embodiment, the support mechanism 36 is a ball screw assembly which is attached to the upper bracket 47 and powered by an electric motor (not shown) to raise and lower the operator platform 32. The ball screw assembly comprises a rod 52 having male threads, a nut 54 having corresponding female threads, and a plurality of ball bearings which rotate within the female threads. A power source, such as an electric motor (not shown), operates gearing 58 which may rotate either the rod 52 or the nut 54 to cause the non-rotating component, the nut 54 or the rod 52, respectively, to move in a linear direction. The support mechanism 36 is lengthened or shortened, according to the direction of rotation, to raise or lower the operator platform 32 and the adjustable conveyor 35. The operator platform 32 may contain control means 11 for raising and lowering the operator platform 32 and maneuvering the mobile base frame 24.

The mobile base frame 24 of the present invention may be any type of mobile, powered unit which is driveable and maneuverable in all directions. The mobile base frame 24 may house an electric motor (not shown) for propelling the mobile base frame 24, a support mechanism 36 for raising and lowering the operator platform 32, and any other mechanisms needed for the operation of the conveyor system 1. The operator platform 32 can be raised and lowered to any height and the mobile base frame 24 may be maneuvered from side to side as needed to load and unload cargo at the optimum position for the safety and efficiency of the worker. The operator platform 32 may be provided with variable extensions on the sides to allow the width of the operator platform 32 to be adjusted as needed for optimum positioning of the cargo loader within a storage container. However, in a particularly preferred embodiment, the width of the operator platform 32 is substantially equal to the width of the inside of a standard eighteen wheel trailer so that the need for extensions and guard rails is eliminated.

Figure 8:
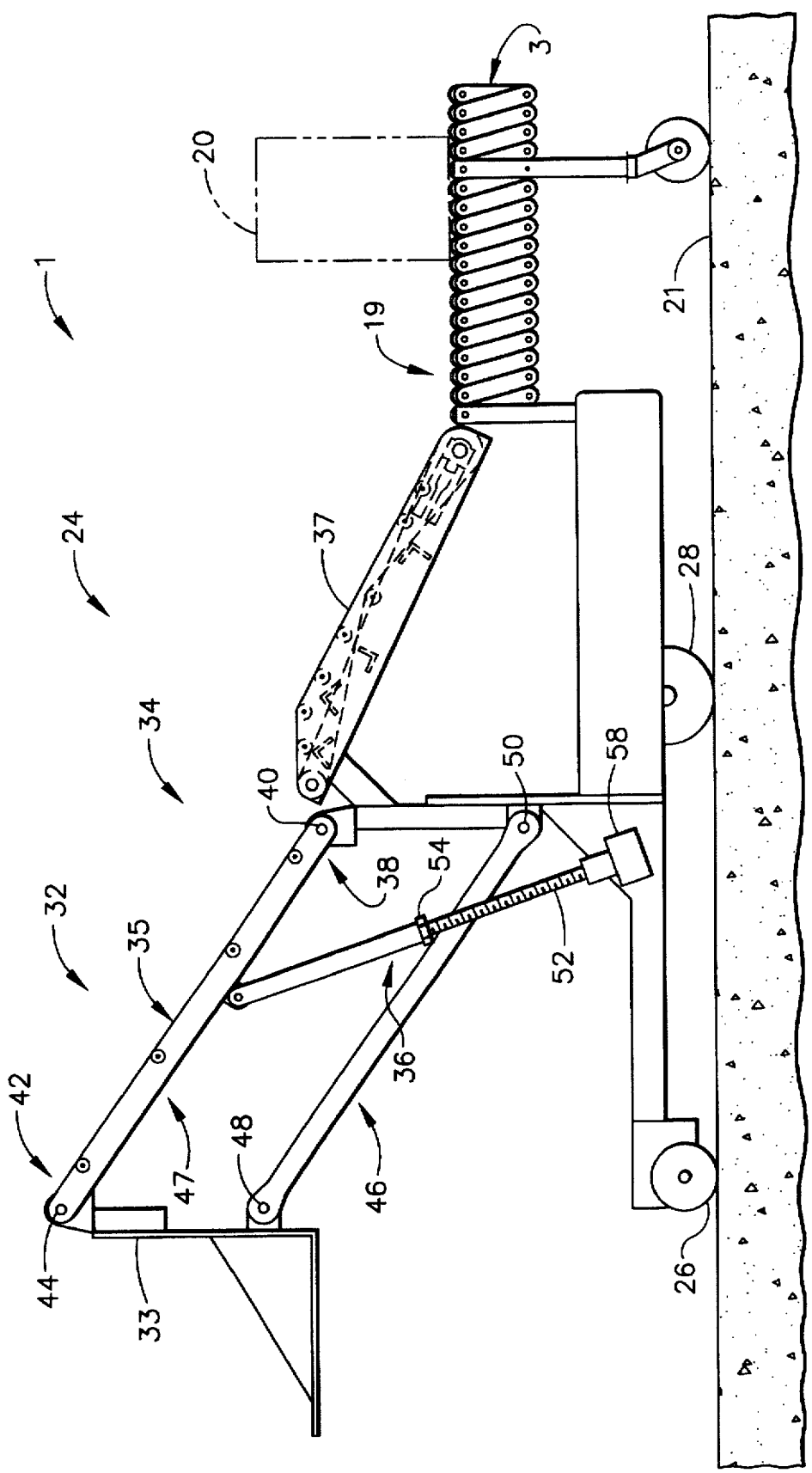
FIG. 8 is a side view of an alternate embodiment of the present invention with the operator platform shown in a raised position.

The first conveyor means 34 may be a single continuous belt conveyor unit. When the first conveyor means is a single belt conveyor (not shown), one stationary end of the upper bracket 47 of the operator platform 32 is mounted at a height to receive cargo from the adjoining second conveyor unit 3. The opposite end of the upper bracket 47 is vertically adjustable by support mechanism 36. The single belt conveyor rotates in conjunction with the upper bracket 47 to deliver cargo to and from the worker area 33. In a particularly preferred embodiment, the conveyor means 34 may be two short cooperating conveyors, such as vertically adjustable conveyor 35 and ramp conveyor 37, as shown in FIGS. 7 and 8. The ramp conveyor 37, having an upper end 39 and a lower end 41, is preferably mounted on and forms a part of the mobile base frame 24. The lower end 41 of the ramp conveyor 37 is positioned at a height to receive cargo 20 directly from the adjoining second conveyor unit 3. The upper end 39 of the ramp conveyor 37 is positioned at a height to deliver cargo directly to the adjustable conveyor 35. Preferably, the ramp conveyor 37 is fixed in a stationary upwardly angled position while the adjustable conveyor 35 is vertically adjustable to cooperate with the operator platform 32. In the second embodiment cargo 20 may be transported from the conveyor means 3 to the ramp formed by the fixed ramp conveyor 37, subsequently along the vertically adjustable conveyor 35, and finally to the operator (not shown) on the working area 33 for loading.

Preferably, the adjustable conveyor 35 rotates in conjunction with the upper bracket 47 of the operator platform 32. The upper bracket 47 is connected at one end 38 to the base frame 24 by a pivot connection 40 which allows the upper bracket 47 to be rotated through a full range of motion. The upper bracket 47 is mounted at an opposite end 42 on the worker area 33 by a pivot connection 44. The lower bracket 46 is attached to the worker area 33 as well as to the mobile base frame 24 by pivot connections 48 and 50, respectively. The lower bracket 46 works in conjunction with the pivot connections 48 and 50 to maintain the upright position as well as stabilize the worker area 33 of the operator platform 32 during operation.

A separate conveyor unit 3 is connected to either the tug unit 2 or the mobile base frame 24 for transporting cargo into and out of a storage container. In a preferred embodiment, the conveyor unit 3 is a flexible, expandable conveyor section supported by vertical legs 13 having freely rotating wheels 14 at the bottom. The wheels 14 may be braked or restrained. While any suitable means for transporting cargo may be employed in the conveyor unit 3 of the present invention, preferably, the upper surface of conveyor unit 3 is provided with rollers 15 which are powered and can be operated in either a forward or a reverse direction. The operation of the powered rollers 15 may be controlled by the control means 11 mounted on guard rails 8 or by any other suitable control means. The conveyor unit 3 is connected at a loading end 19 to the tug unit 2 in such a manner that the rollers 15 deliver the cargo directly onto or off of the conveyor section 10 mounted on the platform 6. As the platform 6 is raised or lowered, the loading end 19 conveyor unit 3 is raised or lowered to a height corresponding to the height of conveyor section 10. As shown in FIGS. 1 and 2, the loading end 19 of conveyor unit 3 is provided with at least one, and preferably two or more, extendable and retractable struts 16 for supporting the loading end 19 of conveyor unit 3 when loading end 19 is in an elevated position. The struts 16 may be powered by pneumatic pumps 22, as shown in FIG. 4, or the struts 16 may be extended and retracted by any other suitable means. In a preferred embodiment, the operation of pneumatic struts 16 is coordinated with the movements of platform 6 on tug unit 2 by the control means 11 mounted on the guard rails 8. However, in the second embodiment of the conveyor system 1 of the present invention, one end 41 of the conveyor means 34 is permanently positioned at the same height as the loading end 19 of the separate conveyor unit 3, as shown in FIGS. 7 and 8. Therefore, the retractable struts 16 may be omitted from the embodiment shown in FIGS. 7 and 8. The struts 16 also are provided with freely rotating wheels 14 which may be braked or restrained as needed. The entry end 18 of conveyor unit 3 is maintained at a suitable height for allowing the worker to safely and efficiently load and unload the cargo.

Although the powered tug unit 2 and the mobile base frame 24 may be operated by hydraulic drive, any suitable means for powering the tug unit 2 or the mobile base frame 24 of the present invention may be employed. However, the use of internal combustion engines is not common, as dangerous fumes are given off in confined spaces, such as are encountered in container loading. Electric power may be provided on the tug unit 2 or the mobile base frame 24 and coupled to the conveyor unit 3, which is electrically driven; alternately electric power for driving the conveyor unit 3 may be provided from a separate source, such as from a loading dock.

Figure 6:
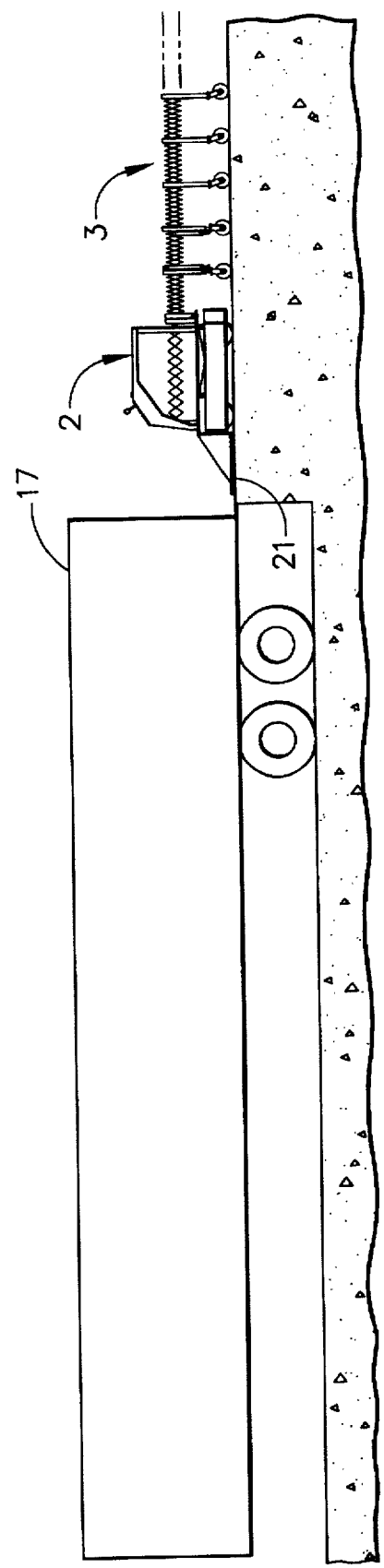
FIG. 6 is a side view illustrating the conveyor system of the present invention with the tug unit in a lowered position and the conveyor unit in a retracted position.

In use, the conveyor system 1 is typically employed when loose items of cargo 20 must be manually loaded into a rack or stacked into a container, such as the trailer 17 shown in FIGS. 5 and 6, where such loading would involve lifting the cargo overhead, or where the loading crew of cargo handlers would have to work from an elevated platform to reach all areas, and would have to lift the cargo items 20 into position.

When loading or unloading cargo, a worker stands on the mobile operator platform 6 mounted on the tug unit 2. The tug unit 2 is driven into the container 17 to the point of loading. The tug operator then positions the platform 6 at the optimum working height and distance from the location of the cargo to be loaded or unloaded. The conveyor unit section 10 has already been adjusted on the platform 6 to a stationary height which is most suitable for safe and efficient loading and unloading of cargo by the particular worker standing on the operator platform.

Similarly, a worker may drive the mobile base frame 24 into the container 17 and position the mobile base frame 24 and operator platform 32 for optimum working conditions. As shown in FIG. 7, since the ramp conveyor 37 may be positioned at the height of the conveyor unit 3, no vertical adjustment of the conveyor unit 3 is required.

At the entry end 18, a second worker loads cargo items 20 onto the powered roller conveyor unit 3. The rollers 15 at the entry end 18 of conveyor unit 3 are positioned at the optimum height for minimizing worker strain when lifting and loading cargo 20. Optionally, a vertically adjustable entry platform, such as the entry platform described in U.S. Pat. No. 5,325,953, may be positioned at the entry end 18 of conveyor unit 3. The upper surface of the entry platform may be provided with rollers in a herringbone pattern or other means for automatically centering the cargo items 20 prior to being delivered to the conveyor unit 3. The entry platform allows the cargo items 20 to be easily tossed or placed on the conveyor system 1 without any particular requirements for accuracy in positioning the cargo. As shown in FIG. 5, typically, the conveyor unit 3 is extendable to a length which allows the cargo 20 to be loaded directly from a loading dock 21 or other storage area into a trailer 17 or other storage container of any length or width. Preferably, the conveyor unit 3 is expandable to a length of up to at least 58 feet to accommodate any standard trailer or truck bed. Significantly, the use of a highly flexible, expandable and retractable conveyor unit 3 allows placement of the entry end 18 of the unit 3 even around corners or in a U-shape as may required by the location of the cargo 20 relative to the inside of the container to be loaded. The cargo items 20 flow along the powered conveyor unit 3 to a working height selected by the worker on platform 6 or operator platform 32. Preferably, the movement of the cargo items 20 on conveyor unit 3 be controlled by a cargo sensing means (not shown) on conveyor section 10 so that items of cargo 20 are delivered onto the first conveyor means 10 as the worker is ready for loading the next item of cargo. This may most easily be accomplished by a photo electric sensor on the conveyor section 10, or by a pressure sensor triggered by the presence of cargo items against the end rollers of the first conveyor means 10.

Use of the conveyor system 1 of the present invention can thus be seen to significantly reduce the risk of back and other body injuries common in the cargo handling field. It can be further seen from the example given that the invention provides a method of transporting loose cargo items to be manually placed in a container or in storage racks which significantly aids the work crew, by automatically properly positioning the work crew and by automatically presenting all items to be loaded at an optimum height for manual movement to minimize stretching or excessive lifting motions by the workers.

Again, the operator platform 6 of tug unit 2, or the operator platform of the mobile base frame 24, positions the work crew at an optimum working height with respect to the cargo being moved. The conveyor unit 3 being connected to either the tug unit 2, or the mobile base frame 24, follows its motions, and the expandable rollers on conveyor unit 3 are adjusted to be at all times at a proper cargo handling height with respect to the workmen. The work crew can then remove cargo items 20 from a stack and place them on the powered rollers 15 of conveyor unit 3 for removal. No bending by the workers is required, as both the work platform and the place to which the cargo is placed is adjustable to proper height in response to the working patterns. Further, because the conveyor system 1 is fully automatic, the workers are not required to stop the flow of work and manually adjust the position of the platform 6, operator platform 32 or conveyor unit 3 as the loading operation progresses.

Although the invention is described with respect to a preferred embodiment, it is expected that various modifications thereto may be made to the preferred embodiment without departing from the spirit and scope of the invention.

Therefore, the scope of the invention is to be determined by reference to the claims which follow.

What is claimed is:

1. A conveyor system for transporting and positioning cargo items to be manually loaded or unloaded by a cargo worker which comprises:

powered positioning means for adjustably positioning a worker and the cargo items, said positioning means including a mobile base frame, an adjustable platform for supporting said worker during the loading and unloading of cargo, and adjustable support means for supporting said platform on said base frame at variable heights, said support means being mounted on said positioning means between said platform and said base frame;

first conveyor means mounted on said adjustable platform for transporting the cargo directly to and from the worker supported by said adjustable platform, said first conveyor means having one end disposed adjacent said worker supported by said adjustable platform at an optimum height for manual movement of the cargo to minimize stretching or excessive lifting motions by said worker supported by said adjustable platform;

second conveyor means for transporting the cargo items to and from a loading area, said second conveyor means being connectable at one end to said positioning means so that the connected end of said second conveyor means remains at the same height as the first conveyor means on the platform to allow the cargo to be directly transported between a cargo worker on said platform and a cargo worker at the opposite end of said second conveyor means; and control means for adjustably controlling the location and operation of said positioning means and said first and second conveyor means.

2. The system of claim 1 wherein said powered positioning means is a driveable tug which is maneuverable in any direction.

3. The system of claim 1 wherein said support means is a hydraulically powered scissors lift which is operable by said control means.

4. The system of claim 1 wherein said second conveyor means further comprises multiple vertical legs having freely rotating wheels for supporting and positioning said conveyor means.

5. The system of claim 1 wherein said second conveyor means further comprises at least one extendable and retractable strut means for supporting the connected end of the second conveyor means when said end is raised and lowered during the loading operation.

6. The system of claim 5 wherein said strut means further comprises a pneumatic pump for automatically extending and retracting said strut means.

7. The system of claim 1 wherein said first and second conveyor means comprises first and second extendable conveyors which are provided with powered rollers for transporting the cargo in both a forward and a rearward direction.

8. The system of claim 7 wherein said rollers are mounted on a flexible, expandable frame for positioning said first and second conveyors in variable configurations.

9. The system of claim 1 wherein said powered positioning means is a mobile base frame mounted on a pair of front wheels and a pair of rear wheels, said front and rear wheels being in a tricycle arrangement, wherein said front wheels are spaced apart and positioned at adjacent corners of said mobile base frame, and said rear wheels are in a side-by-side relation to steer the mobile base frame in any direction.

10. The system of claim 1 wherein the adjustable support means is a ball screw assembly.

11. The system of claim 1 wherein the first conveyor means is a vertically adjustable belt conveyor pivotally mounted on said operator platform.

12. The system of claim 1 wherein the source of power for the powered positioning means is an electric motor.

13. A conveyor system for transporting and positioning cargo items to be manually loaded or unloaded by a cargo worker which comprises:

powered positioning means for adjustably positioning a worker and the cargo items, said positioning means including a mobile base frame, an adjustable platform for supporting said worker during the loading and unloading of cargo, and adjustable support means for supporting said platform on said base frame at variable heights, said support means being mounted on said positioning means between said platform and said base frame;

first conveyor means mounted on said platform for transporting the cargo directly to and from the worker;

second conveyor means for transporting the cargo items to and from a loading area, said second conveyor means being connectable at one end to said positioning means so that the connected end of said second conveyor means remains at the same height as the first conveyor means on the platform to allow the cargo to be directly transported between a cargo worker on said platform and a cargo worker at the opposite end of said second conveyor means; and control means for adjustably controlling the location and operation of said positioning means and said first and second conveyor means;

wherein the first conveyor means is a vertically adjustable belt conveyor pivotally mounted on said operator platform; and wherein the vertically adjustable belt conveyor further comprises a fixed ramp conveyor, the fixed ramp conveyor being mounted on said mobile base frame and disposed at an angle between the adjustable belt conveyor and the second conveyor means.

14. A conveyor system for transporting and positioning cargo items to be manually loaded or unloaded by a cargo worker which comprises:

an electrically powered mobile base frame for adjustably positioning a worker and the cargo items, said mobile base frame being mounted on a pair of front wheels and a pair of steerable rear wheels for steering the mobile base frame in any direction;

an adjustable platform for supporting said worker during the loading and unloading of cargo, said platform being mounted on said base frame, said platform comprising a worker area, an upper bracket, and a lower bracket, each of said upper bracket and lower bracket being pivotally mounted at a first end to said base frame and at a second end to said worker area so that the worker area remains in an upright position as the operator platform is being raised or lowered;

a ball screw assembly for supporting and positioning said platform on said base frame at variable heights, said ball screw assembly being connected at a first end to the upper bracket of said platform and at a second end to said mobile base frame;

a first conveyor means comprising a vertically adjustable belt conveyor and a stationary ramp belt conveyor, said ramp conveyor being mounted at an angle on said mobile base frame so that a first end of said ramp conveyor is positioned to receive cargo from a second conveyor means and a second end of the ramp conveyor is positioned to deliver cargo to said vertically adjustable belt conveyor, and said vertically adjustable belt conveyor being mounted on the upper bracket of said platform for transporting the cargo to and from the upper end of said ramp conveyor to said worker area;

a second expandable conveyor means for transporting the cargo items to and from a loading area, said second conveyor means being connectable at one end to said mobile base frame; and control means for adjustably controlling the location and operation of said mobile base frame, said operator platform and said first conveyor means.

15. A conveyor system for transporting and positioning cargo items to be manually loaded or unloaded by a cargo worker which comprises:

powered mobile base frame for adjustably positioning a worker and the cargo items, an adjustable platform for supporting said worker during the loading and unloading of cargo, an adjustable support mechanism for supporting said platform on said mobile base frame at variable heights, said adjustable support mechanism being mounted on said powered mobile base frame and extending between said powered mobile base frame and said adjustable platform;

first conveyor mounted on said platform for transporting the cargo directly to and from the worker supported by said adjustable platform, said first conveyor member having one end disposed adjacent said worker supported by said adjustable platform at an optimum height for manual movement of the cargo to minimize stretching or excessive lifting motions by said worker supported by said adjustable platform;

second conveyor for transporting the cargo items to and from a loading area, said second conveyor member being connectable at one end to said powered mobile base frame so that the connected end of said second conveyor member remains at the same height as the first conveyor member on the adjustable platform to allow the cargo to be directly transported between the cargo worker on said adjustable platform and a cargo worker at the opposite end of said second conveyor member; and control means for adjustably controlling the location and operation of said positioning means and said first and second conveyor members.

16. The system of claim 15 wherein said adjustable support mechanism is a hydraulically powered scissors lift which is operable by said control means.

17. The system of claim 15 wherein said adjustable support mechanism is a ball screw assembly.

18. The system of claim 15 wherein said first conveyor is a vertically adjustable belt conveyor pivotally mounted on said adjustable platform.

19. The system of claim 18 wherein the vertically adjustable belt conveyor further comprises a fixed ramp conveyor, the fixed ramp conveyor being mounted on said powered mobile base frame and disposed at an angle between the adjustable belt conveyor and the second conveyor member.

* * * * *